United States Patent [19]

Black et al.

[11] Patent Number: 5,764,729
[45] Date of Patent: Jun. 9, 1998

[54] LOCAL ALARM SYSTEM TAMPER PROTECTION DEVICE WITH DUAL CONDUITS

[75] Inventors: Brian W. Black; Brian K. Clift, both of Vidalia, Ga.

[73] Assignee: Brian Company Enterprises, Lyons, Ga.

[21] Appl. No.: 650,557

[22] Filed: May 20, 1996

Related U.S. Application Data

[63] Continuation-in-part of Ser. No. 385,886, Feb. 9, 1995, Pat. No. 5,519,756.

[51] Int. Cl.$^6$ .................................................. H04M 11/04
[52] U.S. Cl. .............................. 379/44; 379/49; 379/438; 340/566
[58] Field of Search ............................. 379/33, 44, 387, 379/397, 399, 402, 411–413, 417, 419, 428, 429, 437, 430, 440, 442, 445, 451, 453, 457; 340/565, 566, 568–570, 665, 689, 540, 693; 70/277, 279, 282, 455

[56] References Cited

U.S. PATENT DOCUMENTS

| | | | |
|---|---|---|---|
| 3,748,389 | 7/1973 | Casterline et al. | 179/5 R |
| 3,767,867 | 10/1973 | Altenberger | 179/175.25 |
| 3,813,500 | 5/1974 | Roberts | 179/175.25 C |
| 4,361,833 | 11/1982 | Allgood | 340/533 |
| 4,386,129 | 5/1983 | Partus | 200/43.22 |
| 4,559,828 | 12/1985 | Liszka | 73/658 |
| 4,800,588 | 1/1989 | Poster, Jr. | 379/412 |
| 4,887,290 | 12/1989 | Dop et al. | 379/33 |
| 4,969,178 | 11/1990 | Chen et al. | 379/33 |
| 5,185,779 | 2/1993 | Dop et al. | 379/33 |
| 5,219,386 | 6/1993 | Kletzmaier et al. | 70/277 |
| 5,315,654 | 5/1994 | Kraft | 379/438 |
| 5,369,548 | 11/1994 | Combs | 361/643 |
| 5,519,756 | 5/1996 | Clift | 379/44 |

FOREIGN PATENT DOCUMENTS 2605170   4/1988   France ........................... H04Q 9/00

OTHER PUBLICATIONS

Manufacturer's Sales Brochure Telephone Line Security; undated Enclosures for Security, Las Vegas, NV.
Manufacturer's Sales Brochure Omegalarm D8108A Attack Resistant Enclosure Fax date: Jul. 11, 1995 Radionics, Salinas, CA.

*Primary Examiner*—Wing F. Chan
*Attorney, Agent, or Firm*—Robert R. Reed; Cort Flint

[57] ABSTRACT

The present invention is directed to a tamper protection device for protecting a telephone operated security alarm system. In particular, it protects a conventional security alarm system using telephone service lines from being disabled by an intruder before the alarm system has a chance to function. Telephone service lines are generally accessible from the exterior of the structure. The alarm system is protected by providing an service enclosure having a strong box and a dual conduit assembly to enclose the telephone service box and telephone service lines. The essential conduit assembly has inner and outer slotted concentric conduits to fully protect the service lines. The protection device includes sensors and switches to inform the security monitor before an intruder can disable the alarm system. A vibration sensor is activated when movements of the strong box and conduit occur and a signal is generated to announce the intruder. The strong box has two access doors where the locked outside door must be opened to access the locked inside door. Each access door has a separate tamper switch means that generates a signal to also activate the alarm system. If the outside door is defeated the inside door continues to provide security. Another tamper switch means is provided to activate the alarm system if the intruder attempts to remove the strong box from its supporting surface. A total of four separate and redundant signals can activate the security alarm system to announce an intruder.

19 Claims, 5 Drawing Sheets

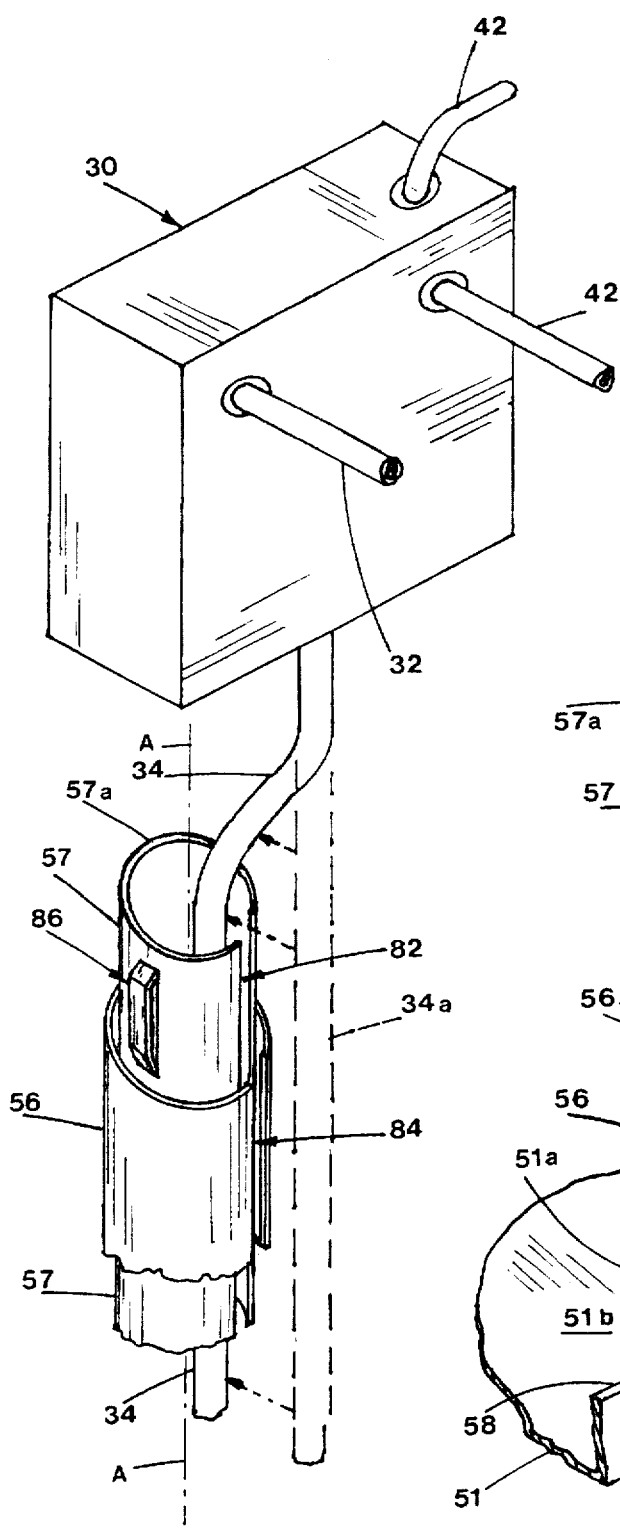
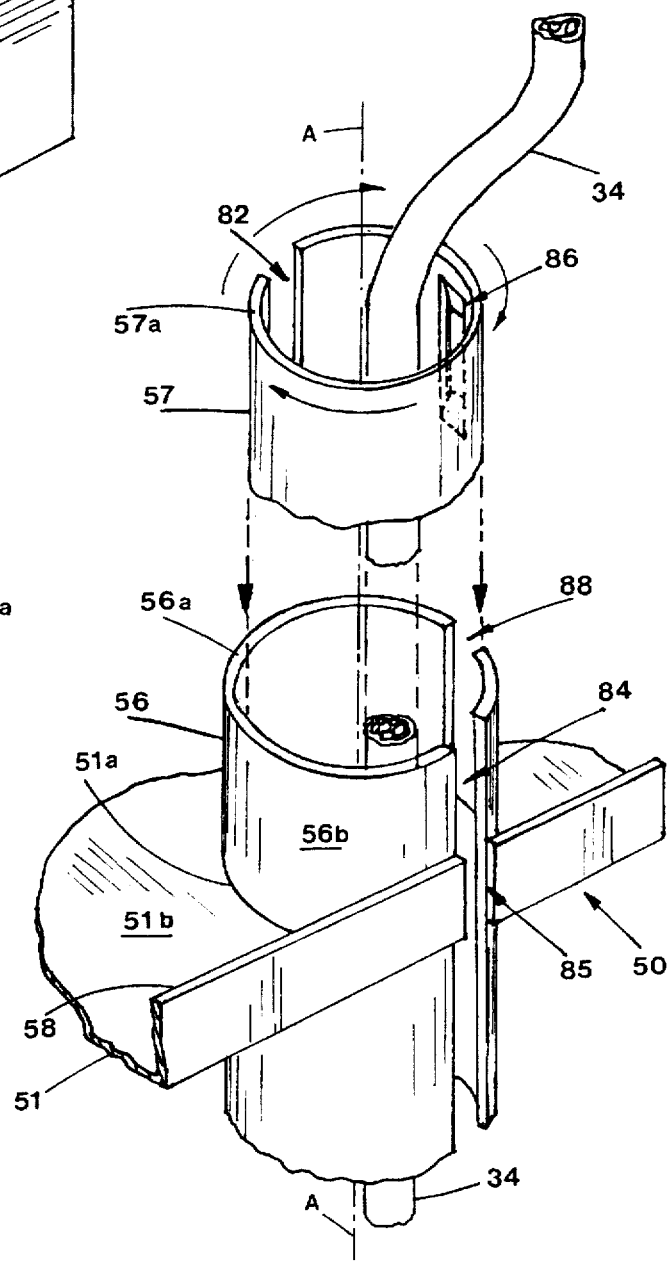
Fig. 4
Fig. 5

LOCAL ALARM SYSTEM TAMPER PROTECTION DEVICE WITH DUAL CONDUITS

This application is a continuation-in-part of application Ser. No. 08/305,886 filed on Feb. 9, 1995, now U.S. Pat. No. 5,519,756.

BACKGROUND OF THE INVENTION

This invention relates to a local telephone system tamper protection device. In particular, it is directed to be used with a telephone operated security alarm system, which may utilize an automatic telephone dialer to call a discrete monitoring station using telephone service lines.

Telephone service lines come from a ground based telephone distribution system and enter a telephone service box mounted on a supporting surface generally exterior to a building structure. The lines can approach the structure overhead or may be buried under the surface of the ground. Present installation of service lines is generally by an underground routing of the telephone service lines to the building structure. Telephone lines exit the ground to extend up the supporting surface to the telephone service box. These service lines are generally accessible to anyone from an exterior to the structure. Telephone service lines exit the service box to enter the structure protected by the building structure itself. The degree of exposure to the telephone service lines being cut after they exit the ground is very large. Intruders are aware of telephone operated security systems which use externally exposed telephone service lines for transmitting alarm signals to personnel at a discrete alarm monitoring station. Prior art in this field, such as the literature on line cut monitors or cellular phone backup systems, have established the fact that conventional security alarm systems are rendered useless when a land based telephone service line is cut.

Cellular backup systems for a standard security alarm system are disclosed in U.S. Pat. Nos. 4,887,290 and 5,185,779. An automatic switching to the cellular system occurs so that a digital communicator or telephone message tape dialer will still transmit a distress call to a central alarm monitor. A line default detector means will cause the telephone system to switch over to the cellular system in response to the fault. The cellular systems will not prevent the fault in the first place, but only reports its occurrence. A cellular backup system, which will take over for an inoperative land based phone line, adds to the installation expense of an alarm system, and a continuing monthly charge for the cellular system may be required.

Line cut monitor systems have addressed the problem by providing a detection device for notification that a line has been cut. These systems typically monitor line voltage and current with a circuit connected to a battery or DC-rectified AC power source. Typical references include U.S. Pat. Nos. 3,748,389; 3,767,867; and 4,969,178. In U.S. Pat. No. 3,748,389 the monitoring system measures impedance between conductors having a DC polarity. A low impedance as well as a high impedance alarm responds to the open circuit or the closed circuit to indicate to the central office that an alarm condition exists at a subscribers set. A field effects transmitter is disclosed in U.S. Pat. No. 3,767,867 to relay the alarm activated by cutting a telephone wire. There is also a panic button in this system which may be activated for turning on manually the alarm. The panic button depends on the occupant of the structure knowing the intruder is present. The invention of U.S. Pat. No. 4,969,178 uses a voltage detection circuit, a current detection circuit, two control circuits and a comparator circuit to detect breaking, short-circuit or illegal connection of the subscriber local line. An alarm circuit and a sound generating circuit give a audio alarm signal when the local line fails. All of the line cut monitors effectively leave an occupant of the structure virtually defenseless in so far as having any means to telephone for help.

A number of devices are known for physically protecting electrical components mounted on a supporting surface and to a limited extent protect the electrical cables connected to these devices. Some of these devices also including some type of sensing device for limited detection of tampering with the device. Typical references include U.S. Pat. Nos. 4,800,588; 5,219,386; 5,315,654; and 5,369,548. In U.S. Pat. No. 4,800,000 a full outer cover member is connected to a partial inner cover with a padlock. The inner cover member carries a locking bolt for attachment to a rear housing member. The inner cover member has an aperture for accessing wiring inside the housing member when the outer cover member is opened and provides protection for only part of the components within the housing.

Protection of the locking devices for individual lockers in a bank vault are disclosed in U.S. Pat. No. 5,219,386. The locking devices are enclosed and measurement value sensors within the locking device detect any prying open of the locker door. A central control unit within the building is dedicated to monitor any unauthorized entry of a locker unit using an electrical bus system. The control unit is contained within the building and operated within the building as a stand alone system. Any tampering with the bus lines and the control unit can be observed by bank personnel without external monitoring using telephone service lines.

The armored telephone line protection system of U.S. Pat. No. 5,315,654 uses a motion sensor to signal the movement of a cover provided to encase a junction block and protect the overhead wires serving the terminal block. A protector channel with exterior fasteners extends from inside the cover to extend up or down the wall to combine with the wall for enclosing the wires by being attached to the surface of the wall. The motion sensors are used to detect any displacement of the cover from the wall or removal of the channel from the cover. The channel is not attached to the cover and the motion sensor detects what is moving inside the cover. A time delay is provided with the motion sensor so that a switch within the cover can turn the motion sensor off.

The patent U.S. Pat. No. 5,369,548 discloses protecting a telephone or electrical distribution box by using a tubular body having an open back and a single removable cover on the front to provide a service box. The cover has a removable cover means consisting of bolts or screws having special heads. Repairmen have a special allen wrench to use on the screws for completely removing the cover. The service box does not enclose wires passing along the wall into the box. The wires go to an interface where incoming telephone wires connect to individual telephone wires. The wires are somewhat protected by a U-shaped shield, being a separate portion from the service box attached to the wall. The U-shaped shield along with the wall give limited protection for the wires. Tamper switches are used to detect the unauthorized removal of the cover and the displacement of the tubular body from the wall.

Two typical devices which also disclose means for physically protecting electrical components mounted on a supporting surface and to a limited extent protect the electrical cables connected to these devices are also known. An enclosure to protect telephone lines from compromise is marketed as Model No. ES601 by Enclosures for Security of Las Vegas, Nev. This device has a enclosure with a removable cover to protect a network interface device and the telephone line. Protective tamper switches create an alarm if the enclosure is pried from the wall or if the screwed-fastener cover is removed. A similar device is the Omega-larm D8108A Attack Resistant Enclosure manufactured and marketed by Radionics of Salinas, Calif. This enclosure also has a single door which is attached by screws, two tamper switches, a door lock and two knockouts to accommodate ¾ inch conduits for electrical wiring to and from the enclosure.

Numerous security systems which transmit alarm signals to a discrete monitoring station are also known in the art. A switch activated alarm system to monitor vandalism is disclosed in U.S. Pat. No. 3,813,500. This alarm system is used with vending machines or pay-station telephones to monitor and control their usage. Contacts of a switch device are coupled with a high-value resistor to make up a leakage path. Current flowing through the leakage path also flows in a low-value resistor which is part of the alarm system circuit. The alarm circuit bridges the talking circuit making the system virtually transparent to a telephone subscriber. An important object of this system is to disable the pay-station or vending machine once vandalism has been attempted. No attempt is made to keep the systems operating once an attempt to vandalize is apparently being made.

The use of tamper switches is common in alarm systems to detect the opening of a window or a door. Further components include motion sensors, heat sensors and video cameras. Such components are normally reserved for commercial structures such as banks and can become expensive for the individual home owner. The use of vibration sensors with telephone line transmission of signals has also been used in special applications. For example, in U.S. Pat. No. 4,559,828 and French Patent No. 2,605,170 the continuous monitoring of machine vibrations is disclosed. The vibration signals are transmitted over telephone lines to a monitoring station for evaluation. These systems operate to continuously monitor vibrations and operate as a closed circuit at all times.

Tamper switches and other sensor devices can be connected in parallel or in series. The disclosure of U.S. Pat. No. 4,361,833 details two normal configurations which are either closed or open loop circuits as well as a "multiple-contact" sensor configuration. The alarm system of this patent can recondition itself by supervising the status of the sensors in the circuit path. Such systems are used with complex alarm systems having many sensors types which can be remotely located.

A primary object of the present invention is to provide protection from tampering with an exposed portion of a local telephone service line as it enters a structure by way of a telephone service box.

Another object of the present invention is to provide an alarm for processing (by a control unit of a conventional security alarm system) in the event of an attempt being initiated by an intruder to tamper with the local telephone service line as it enters the structure and before a successful intrusion can be achieved.

A further object of the present invention is to provide a tamper protection device that can be added to an existing telephone company service to fully enclose the exposed service components without interruption of telephone communications.

Yet another object of the present invention is to have a generally affordable enhancement in protecting a telephone operated security alarm system which can be easily added to the already existing system to improve the protection afforded by the existing system by guarding against normal telephone communication failure.

SUMMARY OF THE INVENTION

The above objectives are accomplished according to the present invention by providing a protection device for the land based telephone service box and line that is effective in operation, flexible in its application and affordable by the general public.

The present invention is used in a telephone operated alarm system which utilizes a telephone service box connected to telephone service lines. The security alarm system includes a security alarm box electrically connected to the telephone service box for transmitting alarm signals to personnel at a discrete alarm monitoring station over the telephone service lines. The invention is a tamper protection device comprising a lockable service enclosure for enclosing the telephone service box to prohibit direct access to the telephone service box by an intruder. A dual conduit assembly is fitted into the enclosure which includes inner and outer concentric slotted conduits. The conduits have a first rotational position for receiving the telephone service lines through slots in the slotted conduits and a second rotational position for fully enclosing a generally accessible and exposed portion of the telephone service lines to prohibit direct access by an intruder. The tamper protection device further includes at least one vibration sensor mounted within the secured service enclosure for detecting vibrations of the service enclosure and the dual conduit assembly caused by any physical tampering of the protection device by an intruder. The vibration sensor generates a first electrical signal when activated in response to the tampering. A connector circuit is electrically connected to the at least one vibration sensor for transmitting the first electrical signal to the security alarm system. The security alarm system generates an alarm signal for transmission over the telephone service lines to announce an intruder to the personnel at the remote monitoring station.

A further embodiment of the invention includes the enclosure having a strong box portion with two access doors and being mounted on the same supporting surface as the service box is mounted. The outside door has a lock and must be opened to gain access to the inside locked door. The strong box may further include a first switch means being actuatable in response to the strong box being displaced from the supporting surface wherein a second signal is generated in the connector circuit. The connector circuit also transmits the second signal to the alarm system to announce an intruder.

An additional embodiment of the present invention includes the outside access door having a second switch actuatable in response to opening the outside door. A third signal is generated in the connector circuit when the second switch is actuated. This embodiment of the present invention may further include the inside access door having a third switch actuatable in response to the opening the inside door. A fourth signal is generated in the connector circuit when the third switch is actuated. The third and fourth signals are transmitted to the security alarm system to announce the intruder from either one of the second switch and the third switch being activated.

In yet another embodiment a telephone operated security alarm system, which utilizes a telephone service box and generally exposed telephone service lines, a tamper protection system includes the following components. A security alarm box is electrically connected to the telephone service box for transmitting alarm signals to personnel at a discrete alarm monitoring station using the telephone service lines. A lockable service enclosure is provided for enclosing the telephone service box to prohibit direct access to the telephone service box within the enclosure by an intruder. A dual conduit assembly is provided to include inner and outer concentric slotted conduits. The assembly is fitted within the service enclosure for fully enclosing a generally accessible and exposed portion of the telephone service lines, to prohibit direct access to the exposed portion of the telephone service lines by an intruder. A vibration sensor is mounted within the service enclosure to detect vibrations of the service enclosure and the dual conduit assembly and to generate a first electrical signal in response to the vibrations when the sensor is activated. A first switch is mounted within the service enclosure being actuatable in response to displacing the enclosure from a supporting surface upon which the service enclosure is mounted to generate a second electrical signal when the first switch is actuated. A locked outside access door closes an access opening in the enclosure and is monitored with a second switch within the enclosure actuatable in response to opening the outside door, to generate a third electrical signal. A locked inside access door also closes the access opening in the enclosure. The inside door is enclosed by and accessible only through the outside door and is monitored by a third switch actuatable in response to opening the inside door, to generate a fourth electrical signal. A first door lock is carried by the outside access door for positively locking the outside door so that the inside access door and the telephone service box are inaccessible. A second door lock is carried by the inside access door for positively locking the inside access door so that the telephone service box is inaccessible. The first and second door locks both have a locked position activated to an unlocked position only by a secured key to gain direct access through the access opening to the inside of the service enclosure. The security alarm box receives any one of the first, second, third and fourth electrical signals so that the security alarm system operates to announce the intruder to a discrete alarm monitoring station using the telephone service lines before the lines can be cut.

DETAILED DESCRIPTION OF THE DRAWINGS

The construction designed to carry out the invention will hereinafter be described, together with other features thereof.

The invention will be more readily understood from reading the following specification and by referencing the accompanying drawings which form a part thereof; wherein an example of the invention is shown and wherein:

FIG. 4 is a perspective view illustrating the placement of telephone service lines into inner and outer concentric slotted conduits in a first rotational position;

Figure 6:
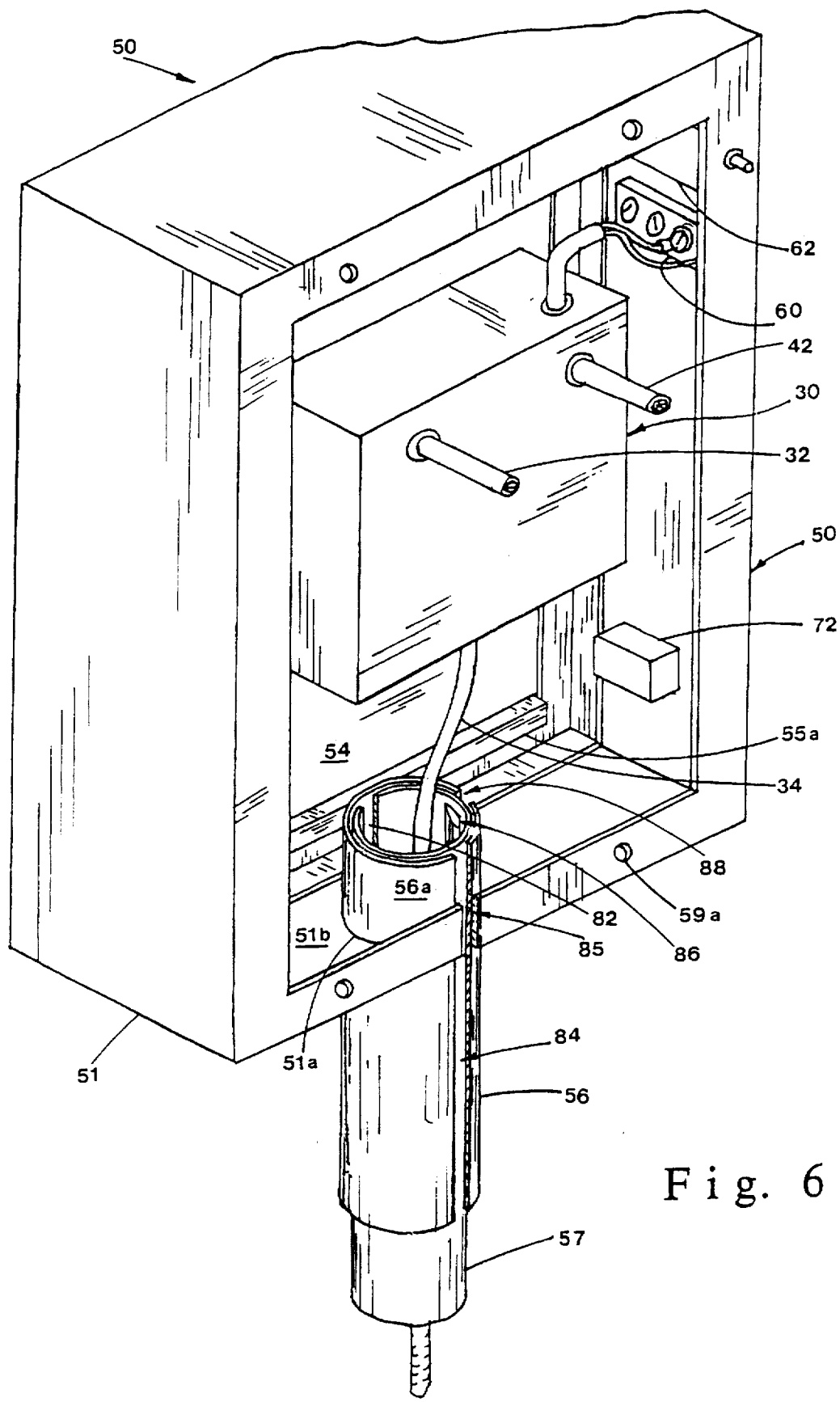

FIG. 5 is a perspective view illustrating the telephone service lines within inner and outer concentric slotted conduits where the inner conduit is rotated for placement in the outer conduit for achieving a second rotational position of the conduits to help fully enclose the telephone service lines; and FIG. 6 is a rear perspective view illustrating the telephone service box and telephone service lines being fully enclosed and protected by the tamper protection device of this invention.

DESCRIPTION OF THE PREFERRED EMBODIMENTS

The present invention preferably provides a tamper protection device having a lockable service enclosure with an open back to be secured to a supporting surface of a structure with appropriate fastener means over a telephone service box used by a telephone operated security alarm system. Telephone service lines are also enclosed as they enters a structure by way of the telephone service box, to effect a tamper protection device encasement therewith. A generally accessible and normally exposed portion of the telephone service lines emerge from underground or are suspended overhead, and connected to the telephone service box. These lines are encased in a dual conduit assembly of the tamper protection device. The conduit assembly portion extends from a strong box portion of the enclosure to a predetermined safe position below the ground surface or above the top of the roof of the structure.

Figure 1:
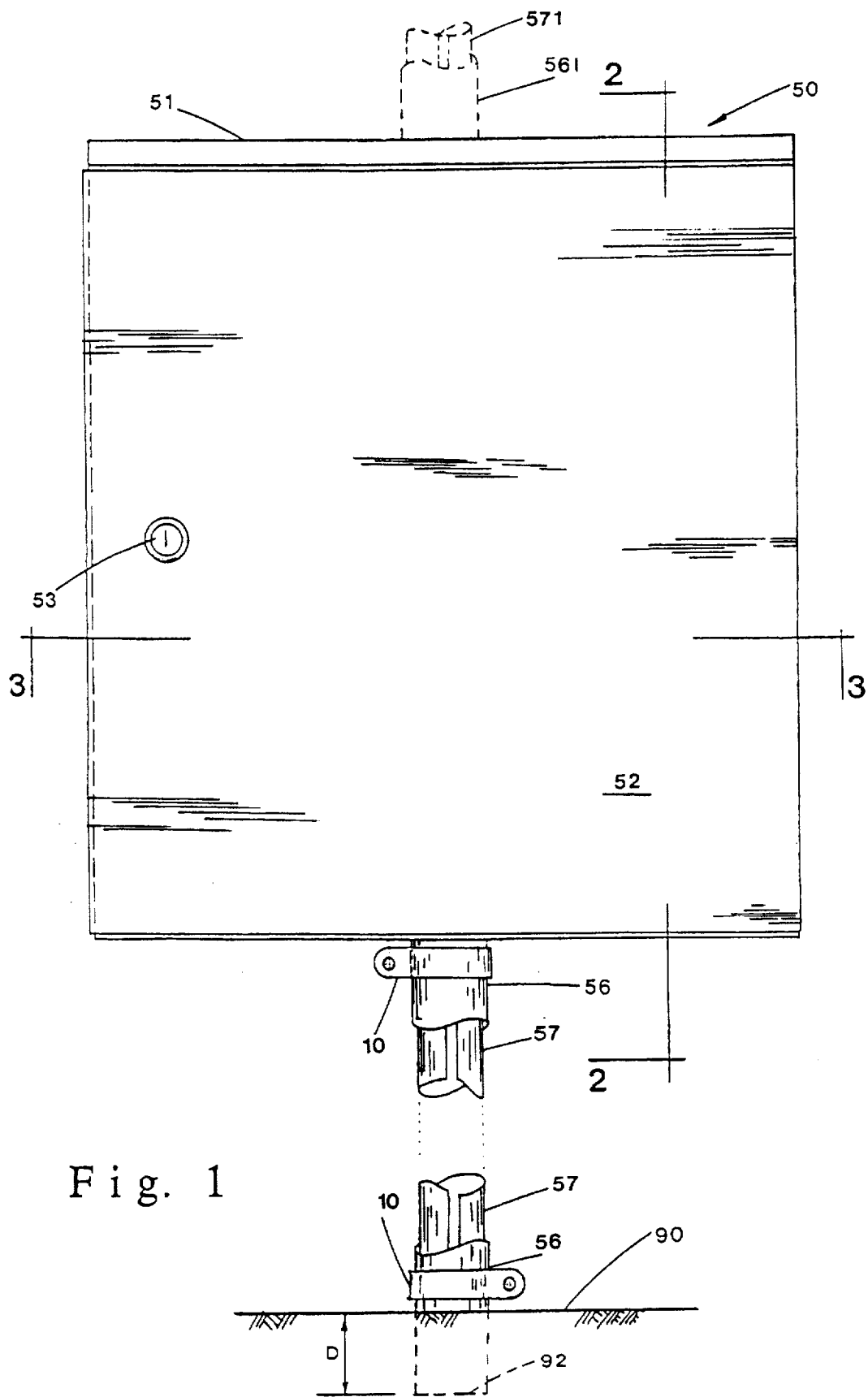
FIG. 1 is a front elevation of the tamper protection device of this invention showing a lockable service enclosure and a dual conduit assembly.

A front elevation view of a preferred lockable service enclosure 50 is illustrated in FIG. 1. The strong box 51 of the enclosure has been secured to the supporting surface of the structure over the service box and the conduit assembly C extends to a distance D below the ground surface 90. Clips 10 can be used to help support the conduit assembly. However, the conduit assembly is generally capable of supporting itself without clips. The distance D is preferably in a range of about 12 to about 18 inches. An alternate configuration for telephone lines coming from above includes the conduit assembly C' having an outer conduit 561 and an inner conduit 571 extending above the enclosure and fitting within the strong box 51 of the enclosure. The height of the conduit assembly C' above the strong box should be sufficient to prohibit reasonable access to the telephone service line. Access to the enclosure starts with the outside door 52 having a outside door lock 53 followed by an inside door 54 also having a lock 55.

The lockable service enclosure 50 and an outer conduit 56 or 561 of the conduit assembly is made from any suitable material from the group consisting of steel, copper, aluminum, iron or combinations thereof to provide an enclosure resistant to an intruder and one which will vibrate when disturbed. Non-metallic materials can also be used within the scope of this invention provided a functional tamper protection device is achieved.

According to the present invention, if an attempt is made by an intruder to access the telephone service box or telephone service lines, a vibration sensor will detect any vibrations of the enclosure. The vibration sensor is located within the lockable service enclosure 50 and can be seen in the views illustrated in FIGS. 2, 3 and 6. The vibration sensor 72 is preferably located near the bottom of the strong box 51 to signal a blow as well as a sawing or cutting of the strong box or the outer conduit 56, 561 connected thereto. The vibration sensor 72 can be positioned to respond to any vibration or displacement which may be imposed on the enclosure and the conduit assembly. The supporting clips 10 must have a loose fit to allow conduit assembly vibrations to be transmitted to the vibration sensor within the service enclosure. The most likely movement is a side to side displacement of the enclosure. Therefore, the preferred location of the vibration sensor 72 is on a side surface of the strong box to sense side to side movements. A number of vibration sensors can be used in parallel or in series to respond to other enclosure and conduit assembly displacement components. A single vibration sensor 72 is preferred for a cost effective tamper protection device. The vibration sensor allows a first or vibration signal to be generated in response to sensed vibrations when the sensor is activated. The existing telephone operated alarm system will be activated by this vibration signal.

Figure 2:
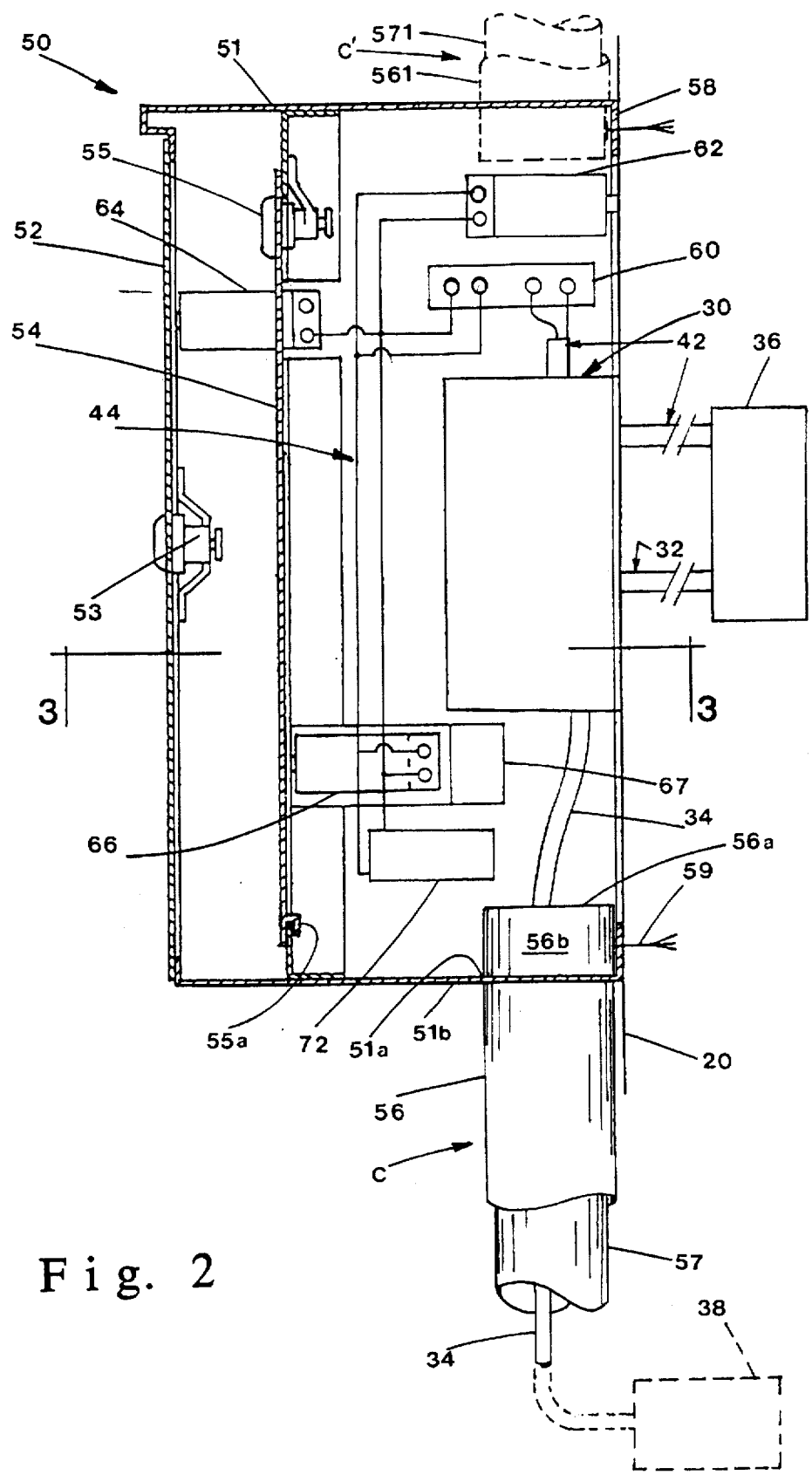
FIG. 2 is a sectional view of the tamper protection device of this invention, taken along line 2—2 in FIG. 1, showing a telephone service box and telephone service lines being protected by a dual conduit assembly and service enclosure with two locked access doors and including parallel connected electrical monitoring components.
Figure 3:
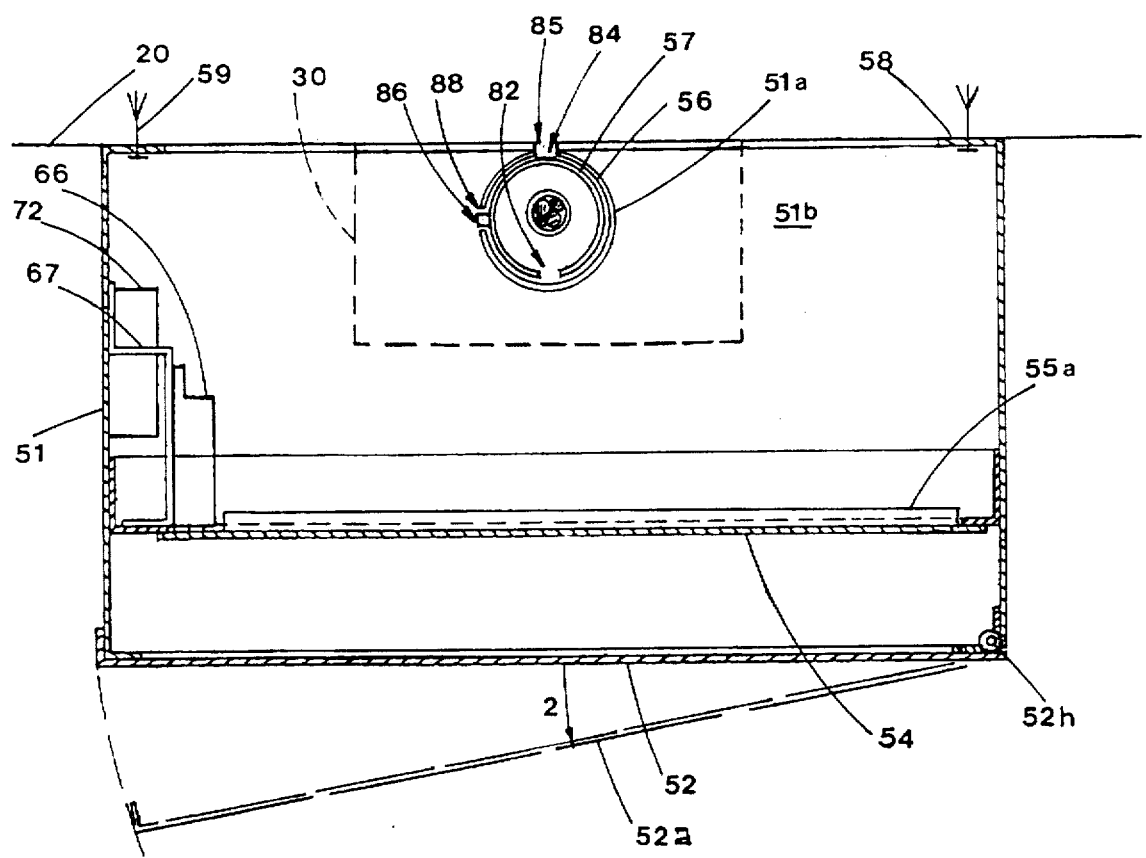
FIG. 3 is a sectional view of the device of this invention, taken along line 3—3 in FIG. 1, showing details of the preferred service enclosure as well as some of the preferred components within the enclosure and the dual conduit assembly fitted within the enclosure.

The telephone service box 30 can contain the components of the telephone operated security alarm system. However, the preferred location of a security alarm box is within the structure for added protection of the system. The security alarm box 36 is preferably remote from other components of the telephone operated security alarm system (FIG. 2). Components of the security alarm box may include a control panel for operating the alarm system for the structure, discrete dialer hardware, local audio transmitter, alarm connector circuits and the like. The remote security alarm box 36 is electrically connected to the telephone service box 30 by way of connector and telephone alarm circuits 42 and 32 respectively. FIGS. 2, and 6 show a first electrical connector system 42 coming through the telephone service box 30 to a terminal bar 60 within the enclosure 50. Alternately, this connector system can go directly from an service alarm box 36 to the terminal bar 60. A typical terminal bar is Radio Shack Catalog No. 274-658 as manufactured for Radio Shack, a Division of Tandy Corporation, Fort Worth, Tex. At least a portion of the telephone service lines 34 serving the structure through the telephone service box become alarm service lines 32. Alarm service lines 32 are connected to the security alarm box 36 for transmitting alarm signals to personnel at a discrete alarm monitoring station 38 over the telephone service lines 32 and 34.

The vibration sensor 72 is operated by a second electrical connector system 44 as illustrated in FIG. 2. The terminal bar 60 is the interface component between the second connector system 44 and the first connector system 42. The second connector system can be operated as either an open or a closed loop electrical system. In an open loop system the first or vibration signal is generated when the movement of the enclosure or conduit assembly activates the vibration sensor to make contact. The vibration sensor 72 can be made more sensitive when operated as normally closed system activated by breaking contact to provide a first or vibration electrical signal. The preferred operation means is to have a open loop system. For further details of a typical vibration sensor refer to Radio Shack Catalog No. 49-521 as manufactured in Mexico for Radio Shack, a Division of Tandy Corp. of Fort Worth, Tex.

The tamper protection device may also include a plurality of tamper switches. For example, one tamper switch may be a first switch that is actuated when the service enclosure is removed by an intruder from its supporting surface. The first switch 62, illustrated in FIGS. 2 and 6, is mounted on the inside of the service enclosure 50 and contacts the supporting surface 20. When an intruder attempts to displace the service enclosure 50 from the supporting surface 20 a second or enclosure signal is generated by the first switch 62 being activated. The same first and second electrical connector systems 42 and 44 used for the vibration sensor also transmits the enclosure signal to the security alarm system to announce an intruder.

The tamper protection device of this invention includes the lockable service enclosure with a strong box having an access opening. Two access doors are used in the tamper protection device of this invention to close the access opening, as illustrated in the sectional views of FIGS. 2 and 3. An outside locked access door 52 must be unlocked and rotated open to gain access to the inside locked access door 54. This double door system allows enough time for the security alarm system to be activated by door tamper switches before an intruder can cut the telephone service line 34. Each door is equipped with a cabinet type locking mechanism being a first door lock 53 carried by the outside door 52 and a second door lock 55 carried by the inside door 54. The outside door 52a swings through an angle 2 about an inside hinge 52h when unlocked and opened. The preferred type hinge is a typical piano type hinges that is secured within the strong box, tamper proof and not capable of being taken apart. The first door lock and hinge provide a first attachment for affixing the outside access door. The inside door has a bottom channel 55b to retain the locked inner door. The second door lock can be unlocked to provide access to the telephone service box and connecting telephone service lines. The second door lock and bottom channel provide a second attachment for affixing said inside access door. This two door arrangement is the preferred embodiment for closing the access opening of the enclosure, but double hinged and locked doors is within the scope of this invention.

The two locked access doors 52 and 54 to close the access opening of the enclosure are preferably equipped with door tamper switches. However, only an outside door switch is essential to providing a time delay for maintaining the integrity of the security alarm system while an alarm signal is being transmitted over telephone service lines the a discrete monitoring station. The outside access door 52 has a second or outside door switch 64 positioned inside the secured enclosure 50 being actuatable in response to opening the outside access door 52. The outside door switch generates a third or outside door electrical signal when the outside door is opened to activate the outside door switch. The inside door 54 has a third or inside door switch 66 positioned inside the secured enclosure 50 being actuatable in response to opening the inside door 54. A bracket 67 is used to position the third switch 64 within the secured enclosure. The inside door switch generates a fourth or inside door signal when the third switch is activated. The system is redundant in that the inside door switch 66 for the inside door 54 performs a backup function in case the outside door switch 64 for the outside door 52 fails to operate. The same telephone operated alarm system will be activated by signals transmitted by the connector circuit with either or both the inside door or third signal and the outside door or fourth signal. These two door tamper switches 64 and 66 are preferred in addition to the vibration sensor 72 and the first or enclosure switch 62 for providing a complete set of electrical signal options when activated to operate the security alarm system to announce an intruder. Any one of the three tamper switches 62, 64 and 66 or the vibration sensor 72 will can provide electrical signals when activated for operating the security alarm system.

Electrical signals can be generated by producing a current flow by closing the connector circuit. This is the case when the normal (no alarm) operating condition is an open loop circuit. Electrical signals can also be generated by interrupting a current flow by opening the connector circuit. This is the case when the normal (no alarm) operating condition is a closed loop circuit. Generally speaking, when any one of the tamper switches or the vibration sensor is activated it is changed from its normal (no alarm) operating condition to an intruder (alarm) operating condition to activate the security alarm system. The tamper protection device can be operated either as an open or a closed loop system. The electrical connectors of FIG. 2 illustrate the preferred open loop system having the vibration sensor and the three tamper switches connected in parallel.

The three tamper switches, being switches 62, 64 and 66, are preferably made to have a plunger portion that extends from a housing portion of the tamper switches which opens the circuit between terminal ends when the plunger is depressed. They are mounted in the enclosure 50 such that the plunger is depressed and the second electrical connector system 44 is operated as an open circuit system with the switches in parallel and no current flow. When either one of the two access doors 52, 54 is opened or the enclosure is removed from the supporting surface the plunger extends from the housing portion and the two terminals ends are connected to close the open circuit and generate a current flow in the second electrical connector system to indicate an alarm signal. The three switches 62, 64 and 66 can also be made to operate in series such that the tamper switches close the circuit when the plunger is depressed, and a current flows in the second electrical connector system indicates no alarm. When either access door is opened or the enclosure is removed from the wall, the plunger extends and the terminal ends open the circuit so the current flow stops to indicate an alarm signal. As previously discussed, either method of operation generates a signal for the alarm system to respond to. A typical tamper switch is the DM series pushbutton switch (1DM2) manufactured by Micro Switch, a Division of Honeywell in Warren, Ill.

The telephone service lines come from a telephone distribution line and enter a telephone service box mounted on a supporting surface generally exterior to the structure. As previously discussed, the lines can approach the structure overhead or may be buried under the surface of the ground. These service lines are generally accessible to anyone from an exterior to the structure. Telephone service lines exit the service box to enter the structure protected by the structure itself.

The telephone service lines outside the service enclosure are protected in this invention by a dual conduit assembly extending from below the ground to the telephone service box as previously discussed and illustrated in FIG. 1. A novel and useful means for fully enclosing the exposed portion of the telephone service lines 34 as they interface with the telephone service box 30 is disclosed in this invention, as illustrated in FIGS. 4 and 5. Telephone alarm lines 32 are protected as they enter the structure. The dual conduit assembly C includes a slotted inner conduit 57 and a slotted outer conduit 56. The conduits are positioned concentric to each other so that they both have the same centerline axis A—A. The inner conduit is easily rotated within the outer conduit to aid in installing the telephone service line 34 within the conduits. The outer conduit 56 has a preferred inside diameter in a range of about 1.0 inch to about 1.5 inches. The inner conduit has a preferred inside diameter in a range of about 0.75 inch to about 1.0 inch. Other inside diameters of the inner and outer conduits are also within the scope of this invention.

Installation of the tamper protection device includes a first step of placing the telephone service lines 34 inside the dual conduit assembly C. Slots in both the inner and outer conduits provide an opening for slipping the service lines 34 inside the conduit assembly as illustrated in FIG. 4. Slot 84 is provided the full length of the outer conduit 56 and slot 82 is provided the full length of inner conduit 57. The inner and outer conduits are rotated to a first rotational position for aligning slots 82 and 84 to receive the service lines 34. The inner conduit is held a sufficient amount above the outer conduit when being rotated to allow space for a projected sidewall portion 84 of the inner conduit to clear the end 56a of the outer conduit. Service lines 34a are moved to be inside the dual conduit assembly adjacent the centerline axis A—A. The service enclosure may or may not be in place when the telephone service lines are being positioned within the dual conduit assembly.

The second step of installing the tamper protection device includes fully enclosing the telephone service lines within the dual conduit assembly. FIG. 5 illustrates the inner conduit 57 being rotated in the direction shown by the curved arrows. A notch 88 is provided in the end 56a of the outer conduit 56 to receive the projected sidewall portion 86 of the inner conduit 57. Rotation of the inner conduit continues until a second rotational position is achieved where the projected sidewall portion 86 can fit into the notch 88 of the outer conduit. The inner conduit is lowered in the direction of the arrows parallel to the centerline axis A—A until the edge 57a of the inner conduit coexists with the edge 56a of the outer conduit (FIG. 6). The inner conduit 57 is held in place within the outer conduit 56 so that the slot 82 of the inner conduit is rotated away from the slot 84 of the outer conduit. This position is to deny access to the telephone service lines 34 inside the conduit assembly C.

Telephone service lines coming into a service enclosure from above must provide for supporting the inner conduit 571 within the outer conduit 561. A similar installation means as the one described above can be used for locking the inner conduit 571 to the outer conduit 561 at their lower end for fully protecting the telephone service lines within the conduit assembly C'. In particular, a J-shaped notch in the outer conduit can be used to support a pin attached to the inner conduit.

The telephone service line is fully enclosed when the lockable service enclosure 50 is mounted on the same supporting surface that the telephone service box is mounted upon to enclose the telephone service box. The conduit assembly is fitted within the service enclosure to fully protect the telephone service lines. That portion of the service enclosure 50 that interfaces with the conduit assembly is illustrated in FIG. 5. A tight fit is necessary at an interface 51b between a bottom surface 51b of the enclosure and the outer surface 56b of the outer conduit 56. This tight fit is provided so that vibrations of the dual conduit assembly are transmitted to the strong box 51 of the enclosure. The vibration sensor is mounted within the strong box. A slot 85 can also be provided in the service enclosure to allow the telephone service lines 34 to be placed within the conduit assembly without the need to disconnect the telephone service lines 34 from the telephone service box 30.

The installed tamper protection device is illustrated in FIG. 6. This view is from the back side of the device with the supporting surface and a lower portion of the conduit assembly not shown. The telephone service box 30 and the telephone service lines 34 are fully protected by the service enclosure 50 and the dual conduit assembly C. The inner and outer conduits are in the second rotational position to fully protect the otherwise exposed portion of the telephone service lines. The projected sidewall portion 86 of the inner conduit 57 is engaged within the notch 88 of the outer conduit 56. This rotational position places the slot 82 of the inner conduit away from the slot 84 of the outer conduit to fully protect service lines 34. The slot 85 of the enclosure facilitates the placement of service lines 34 within the conduit assembly without disconnecting the telephone service lines.

A tight fit at the interface 51b is provided between the outer conduit 56 and the bottom surface 51b of the enclosure's strong box 51. This tight fit allows the vibration sensor 72 to be activated by any vibrations of the enclosure or the conduit assembly. The vibration sensor is connected to the terminal bar 60 and a first electrical connector system 42 transmits a vibration signal to a security alarm system 36 within the structure (FIG. 2). An alarm signal is then transmitted to the telephone service box 30 using a telephone line 32 and further to a discrete monitoring station 38 using the telephone service lines 34. Other active alarm components respond in a similar manner. For example, the inside door tamper switch 62 is activated by the opening of inside door 54. This switch is also connected to the terminal bar 60 to operates with the first and second electrical connector systems to transmit an alarm signal to the security alarm system.

The tamper protection device of this invention can be used to protect any telephone system having a service box and service line within the scope of this invention. A separate alarm system may be used to announce the intruder. Any conventional audio or visual on site or other off-site monitoring system would be sufficient for this purpose. Such systems generally operate using a AC-rectified DC power source.

While a preferred embodiment of the invention has been described using specific terms, such description is for illustrative purposes only, and it is to be understood that changes and variations may be made without departing from the spirit or scope of the following claims.

What is claimed is:

1. In a telephone operated security alarm system which utilizes a telephone service box connected to telephone service lines, said security alarm system including a security alarm box electrically connected to said telephone service box for transmitting alarm signals to personnel at a discrete alarm monitoring station over said telephone service lines, a tamper protection device comprising:

a lockable service enclosure for enclosing said telephone service box to prohibit direct access to said telephone service box by an intruder;

a dual conduit assembly fitted into said enclosure which includes inner and outer concentric slotted conduits, said conduits having a first rotational position for receiving said telephone service lines through said slotted conduits and a second rotational position for fully enclosing a generally accessible and exposed portion of said telephone service lines to prohibit direct access by an intruder;

at least one vibration sensor mounted within said secured service enclosure for detecting vibrations of said service enclosure and said dual conduit assembly caused by any physical tampering of said protection device by an intruder, said vibration sensor to generate a first electrical signal when activated in response to said tampering; and a connector circuit electrically connecting said at least one vibration sensor for transmitting said first electrical signal to said security alarm system, wherein said security alarm system generates an alarm signal for transmission over said telephone service lines to announce an intruder to said personnel at said remote monitoring station.

2. The tamper protection device of claim 1 wherein said lockable service enclosure includes a strong box mounted on the same supporting surface as said service box is mounted having an access opening and at least one lockable access door closing said access opening comprising:

an interior hinge rotatably connecting a first edge of said at least one lockable access door to said enclosure positioned within said enclosure for prohibiting access to said hinge from an exterior to said enclosure and generally being tamper proof; and a door lock along a second edge of said at least one lockable access door opposite to said first edge having a key which is secured against general use for positively locking said access door so that said telephone service box is generally inaccessible and secured.

3. The tamper protection device of claim 1, wherein said lockable service enclosure includes a strong box mounted on the same supporting surface as the service box is mounted having two lockable access doors being an outside door with a door lock that must be opened to gain access to an inside locked door.

4. The tamper protection device of claim 3, wherein said strong box has a first switch actuatable in response to said strong box being displaced from said supporting surface, wherein a second electrical signal is generated in said connector circuit when said first switch is activated and said second signal is transmitted to said security alarm system.

5. The tamper protection device of claim 3, wherein said outside access door has a second switch actuatable in response to opening said outside door, wherein a third electrical signal is generated in said connector circuit when said second switch is actuated and said third signal is transmitted to said security alarm system.

6. The tamper protection device of claim 5, wherein said inside access door has a third switch actuatable in response to opening said inside door, wherein a fourth signal is generated in said connector circuit in response to said third switch being actuated and said fourth signal is transmitted to said security alarm system, whereas said security alarm system announces said intruder from either one of said second switch and said third switch being actuated.

7. The tamper protection device of claim 1 wherein said dual conduit assembly comprises:

a cylindrical outer conduit having a protected end disposed within said enclosure and an outside surface fitted within a bottom surface of said enclosure for transmitting said vibrations to said vibration sensor; and a cylindrical inner conduit disposed within said outer conduit extending the full length of said outer conduit, wherein said outer and inner conduits have a combined position and orientation for providing said second rotational position fully enclosing said exposed portion of said telephone service lines.

8. The tamper protection device of claim 7 wherein said cylindrical outer conduit includes a slot the full length of said outer conduit for receiving said telephone service lines to the inside of said outer conduit and a notch in said protected end of said outer conduit, and wherein said cylindrical inner conduit includes a slot the full length of said inner conduit for receiving said telephone service lines to the inside of said inner conduit when in said first rotational position, said inner conduit having and a projected sidewall portion made to be placed within said notch of said outer conduit for providing said second rotational position of said outer and inner concentric slotted conduits for fully enclosing said telephone service lines.

9. The tamper protection device of claim 7, wherein said cylindrical outer conduit has an inner diameter in the range of about 1.0 inch to about 1.5 inches and said cylindrical inner conduit has an inside diameter in a range of about 0.75 inch to about 1.00 inch.

10. The tamper protection device of claim 1, wherein said connector circuit includes first and second electrical connector systems interconnected by a terminal bar for energizing said protection device and for transmitting electrical signals to said security alarm box to announce said intruder to said personnel at said discrete alarm monitoring station.

11. The tamper protection device of claim 1, wherein the enclosure and the dual conduit assembly is made from any suitable material from the group consisting of steel, copper, aluminum, iron, or combinations thereof which will easily transmit vibrations when tampered with.

12. In a telephone operated security alarm system which utilizes a telephone service box connected to telephone service lines, said security alarm system including a security alarm box electrically connected to said telephone service box for transmitting alarm signals to personnel at a discrete alarm monitoring station over said telephone service lines, a tamper protection device comprising:

a protective service enclosure for enclosing said telephone service box to prohibit direct access to said telephone service box;

an access opening included in said service enclosure for providing authorized access to said telephone service box;

an inside access door included in said service enclosure to cover said access opening and said telephone service box to prevent any physical tampering with said telephone service box and connecting telephone service lines;

an outside access door included in said service enclosure to enclose said inside access door and said access opening which must be opened to gain access to said inside access door and said service box to further delay any physical tampering with said telephone service box and connecting telephone service lines;

a first attachment for affixing said outside access door to said service enclosure so that said inside access door and said telephone service box are inaccessible, said outside access door having a closed position and movable to an open position only by an authorized person;

a second attachment for affixing said inside access door to said service enclosure so that said inside access door so that said telephone service box is inaccessible, said inside access door having a closed position and movable to an open position only by an authorized person, wherein said outside access door must be opened to gain access to said inside access door to prevent unauthorized door opening and protect said telephone service box against tampering;

at least one switch for detecting movement of at least said outside access door to generate an electrical signal for activating said security alarm system so that at least an outside door signal is transmitted;

a connector circuit to said security alarm system to provide said electrical signal prior to gaining access to any telephone service lines through said inside access door, whereas the security alarm system operates to announce an intruder to said personnel at said discrete alarm monitoring station over said telephone service lines before said lines can be cut; and a dual conduit assembly having inner and outer concentric slotted conduits, said inner and outer conduits having a first rotational position for receiving said telephone service lines by aligning lengthwise slots in said inner and outer slotted conduits each one with the another and a second rotational position for fully enclosing said exposed portion of said telephone service lines by misaligning said slots and rotationally locking said inner slotted conduit with said outer slotted conduit.

13. The tamper protection device of claim 12, wherein said service enclosure includes a strong box having an enclosure switch of said at least one switche actuatable in response to said strong box being displaced from said supporting surface, wherein said electrical signal is an enclosure signal generated in said connector circuit that transmits said enclosure signal to said security alarm system to announce said intruder.

14. The tamper protection device of claim 13, wherein said connector circuit comprises:

a first electrical connector system from said security alarm system to a terminal bar; and a second electrical connector systems from said terminal bar to said plurality of switches including said enclosure switch.

15. The tamper protection device of claim 12, wherein said protective service enclosure has a vibration sensor mounted within said enclosure to detect vibrations of said enclosure and said dual conduit assembly caused by an intruder, said vibration sensor generating said electrical signal as a vibration signal in response to said vibrations, wherein said vibration signal is generated in said connector circuit that transmits said vibration signal to said security alarm system to announce said intruder.

16. The tamper protection device of claim 15 wherein said dual conduit assembly and said enclosure are made from any suitable material from the group consisting of steel, copper, aluminum, iron or combinations thereof that will transmit vibrations of said dual conduit assembly and said enclosure in the form of solid vibrations to said vibration sensor.

17. The tamper protection device of claim 15, wherein said connector circuit includes first and second electrical connector systems and a terminal bar for energizing said at least one switch and said vibration sensor of said protection device and for transmitting at least one of said electrical signals to said security alarm system for further transmission to said discrete alarm monitoring station for announcing said intruder.

18. In a telephone operated security alarm system which utilizes a telephone service box and generally exposed telephone service lines, a tamper protection system including:

a security alarm box electrically connected to said telephone service box for transmitting alarm signals to personnel at a discrete alarm monitoring station using said telephone service lines;

a lockable service enclosure for enclosing said telephone service box to prohibit direct access to said telephone service box within said enclosure by an intruder;

a dual conduit assembly including inner and outer concentric slotted conduits, said assembly fitted within said service enclosure for fully enclosing a generally accessible and exposed portion of said telephone service lines to prohibit direct access to said exposed portion of said telephone service lines by an intruder;

a vibration sensor mounted within said service enclosure to detect vibrations of said service enclosure and said dual conduit assembly and to generate a first electrical signal in response to said vibrations when said sensor is activated;

a first switch mounted within said service enclosure being actuatable in response to displacing said enclosure from a supporting surface upon which the service enclosure is mounted to generate a second electrical signal when said first switch is actuated;

a locked outside access door for closing an access opening in said enclosure and monitored with a second switch within said enclosure which is actuatable in response to opening said outside door to generate a third electrical signal;

a locked inside access door to also close said access opening in said enclosure, said inside door enclosed by and accessible only through said outside door and monitored by a third switch actuatable in response to opening said inside door to generate a fourth electrical signal;

a first door lock carried by said outside access door for positively locking said outside door so that said inside access door and said telephone service box are inaccessible;

a second door lock carried by said inside access door for positively locking said inside access door so that said telephone service box is inaccessible, wherein said first and second door locks both have a locked position activated to an unlocked position only by a secured key to gain direct access through said access opening to the inside of said service enclosure; and said security alarm box receiving any one of said first, second, third and fourth electrical signals so that said security alarm system operates to announce said intruder to a discrete alarm monitoring station using said telephone service lines before said lines can be cut.

19. The alarm system of claim 18, wherein said system further includes a connector circuit having a first system of electrical connectors from said alarm system to a terminal bar and a second system of electrical connectors from said terminal bar to said vibration sensor and said first, second and third switches, wherein said first and second system of electrical connectors interconnect said system as either one of an open circuit system and a closed circuit system for energizing said connector circuit and transmitting at least one of said first, second, third and fourth electrical signals to said security alarm system.

\* \* \* \* \*